Aug. 25, 1964 J. J. QUACKENBUSH 3,145,882
FLUFF FEED HOPPER
Filed Aug. 3, 1962
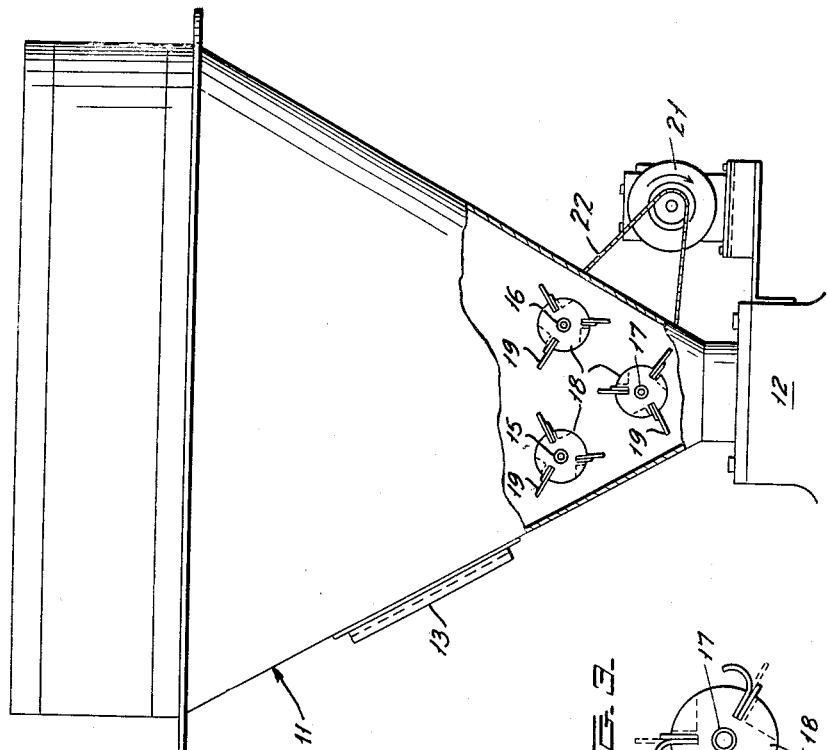
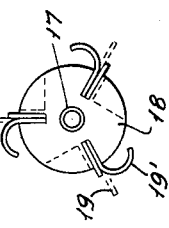
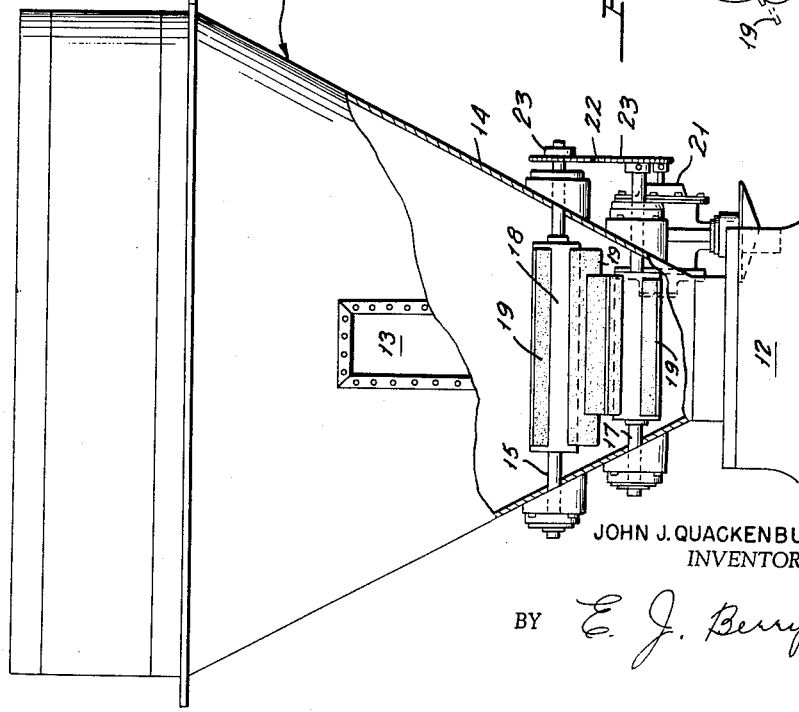
JOHN J. QUACKENBUSH
INVENTOR.
BY E. J. Berry 3,145,882
FLUFF FEED HOPPER
John J. Quackenbush, Rochester, N.Y., assignor to National Distillers and Chemicals Corporation, New York, N.Y., a corporation of Virginia
Filed Aug. 3, 1962, Ser. No. 214,644
3 Claims. (Cl. 222—227)

This invention relates to a mechanism for feeding low bulk density materials into a delivery device, and more particularly to a fluff feed hopper for the mechanical feeding of low density plastics or like materials, such as those obtained by grinding, chopping, shredding or dicing polyethylene, polypropylene and similar plastics, papers or fibers, into an extruder.

Commercially available feeding devices utilizing rigid positive feed mechanisms, i.e., plungers, augers, paddle or star wheels, etc. do not satisfactorily maintain uniform feed rates of low bulk density materials, such as granular or fluff plastic wastes. Such known devices tend to over-compact, cavitate or erratically feed low bulk density materials. In order to overcome such disadvantages various complex drives and torsion controls have been devised, requiring relatively high horsepower drive units.

It is among the objects of the present invention to provide a mechanism for feeding low bulk density materials to a delivery device with a continuous uniform feed, without over-compacting the material fed, or jamming or damaging the feed mechanism.

A further object of the invention is to provide such a mechanism which compacts and uniformly feeds low bulk density materials, which mechanism is simply constructed and efficient in operation.

Other objects and advantages of this invention will be apparent from the following detailed description thereof.

The mechanism for feeding low bulk density materials into a delivery device according to the present invention includes a feed hopper, at least one drive shaft mounted for rotation within the hopper, and at least one flexible beater or pusher blade mounted on the drive shaft, the pusher blade normally compressively feeding the low bulk density materials through the hopper and, upon overloading of the delivery device, being deflected out of feeding engagement with the low bulk density material fed, whereby over-compacting of the material is minimized, if not avoided, and the materials are fed uniformly through the device. The flexible pusher blade or blades of the feeding mechanism of the invention is deflected through angles of up to 40° to 50°, thereby ceasing to feed the low bulk density material without interfering with the actuating drive mechanism for the pusher blade.

When the temporary over-compacting of the bulk material is reduced, the flexible pusher blade resumes its normal position and continues to feed the low bulk density material without permitting voids or gaps or producing surges of such material into the delivery device. The mechanism of the invention thus provides a continuous uniform feed for any given low bulk density material, and yet need not be synchronized with the delivery device or devices fed thereby.

For a fuller understanding of the nature and objects of this invention, reference is made to the following detailed description of a preferred embodiment of the feed mechanism taken in connection with the acompanying drawing in which:

FIGURE 1 is a longitudinal section through a fluff feed hopper embodying the invention, with the walls partially broken away to show the feed mechanism therein;

FIGURE 2 is a partially broken away longitudinal section through the feed hopper of FIGURE 1, taken at right angles to the view shown in FIGURE 1; and FIGURE 3 is an enlarged sectional view of one of the drive shafts of the feed mechanism, showing the pusher blades thereof in their operative and inoperative (deflected) positions.

Referring now to the drawing, a fluff feed hopper 11 is shown for feeding a low bulk density material, e.g., a scrap polyethylene, to an extruder 12 for re-processing. The hopper is of customary frustoconical shape, having a sight glass 13 in the tapering section thereof to permit inspection.

Extending through apertures in the tapering walls 14 of the hopper 11 are drive shafts 15, 16 and 17, mounted for rotation in bearings positioned outside of the feed hopper. Each of the drive shafts has a blade support 18 fixedly mounted thereon for receiving and supporting a plurality of pusher blades 19 (in the disclosed embodiment three such blades are illustrated) extending radially of the drive shaft. The pusher blades 19 are flexible strips of an elastomeric material which, as described hereinafter, effect feeding of the low bulk density material through the feed hopper 11. Preferably, the pusher blades comprise nylon reinforced rubber having a hardness of approximately an 80 Shore durometer.

As shown in FIGURE 2, the flexible blades 19 are mounted on the respective drive shafts 15, 16, and 17, the respective drive shafts are positioned relative to one another and the blade clearances between each pusher blade 19 are so adjusted that the material passed through the feed hopper is fed at an equal rate by each set of pusher blades and uniformly compressed toward the base discharge of the hopper and into the extruder 12. In this manner the bulk density of the material fed is increased by means of a controlled compression.

Over-compacting of the bulk material is minimized, if not avoided, by the illustrated construction since, when the extruder 12 is overloaded and the density of the material at the base of the feed hopper increases, the flexible pusher blades 19 are deflected by the retarding effect of the material fed. As shown in FIGURE 3, the blades are thus deflected from their operative positions at 19 to deflected positions 19' at which they are rendered partially inoperative and cease to compact and feed the fluff material. The rate of feed of the low bulk density material is thereby automatically decreased.

The drive shafts 15, 16, and 17 are driven in tandem through a suitable drive mechanism to produce the constant and controlled material fed from the hopper. The drive mechanism illustrated in the drawing includes a motor 21 which drives a chain 22 engaging sprockets 23 secured to the respective drive shafts. It will of course be understood that other suitable belt, chain or gear drives may be utilized to synchronously drive the respective drive shafts in either the clockwise or counterclockwise directions.

It has been found that the feed mechanism illustrated in the accompanying drawing uniformly feeds low bulk density materials having densities varying from as low as 1.5 pounds per cubic foot to as much as 15.0 pounds per cubic foot without over-compacting, cavitating, or the like. When employed to feed fluff plastics into an extruder the feeding mechanism has successfully maintained feed rates in excess of 700 pounds of material per hour.

It will be apparent to those skilled in the art that various changes may be made in the fluff feed hopper illustrated in the accompanying drawing without departing from the scope of this invention; hence, if desired, additional feed rolls may be located in the hopper, as well as the feed mechanism described, in order to provide an agitator action and thus prevent the low bulk density material fed from "bridging." It is therefore intended that all matter contained in the above description shall be interpreted as illustrative and not in a limiting sense.

What is claimed is:

1. A fluff feed hopper for feeding low bulk density plastic wastes to an extruder, said fluff feed hopper comprising a gravity feeding frustoconically shaped feed hopper having an opening at the bottom, three horizontally disposed drive shafts mounted for rotation in said hopper adjacent the delivery end thereof, one of said shafts being located immediately above said opening and the remaining two shafts being spaced apart on a horizontal plane above that of said first mentioned shaft, three flexible pusher blades mounted on each said drive shaft, said pusher blades being constituted of an elastomeric material having approximately an 80 Shore durometer, the drive shafts and the pusher blades being spaced relative to one another such that the clearance between the respective pusher blades is sufficient to provide normal uniform compressive feeding of the low bulk density wastes through the hopper and, upon overloading of the extruder, the flexibility of said pusher blades permitting deflection thereof out of feeding engagement with the plastic wastes whereby over-compacting of such low bulk density material is minimized.

2. A fluff feed hopper for feeding low bulk density materials into a delivery device, said fluff feed hopper comprising a feed hopper having a delivery aperture defined therein, three horizontally disposed drive shafts mounted for rotation in said hopper adjacent said delivery aperture, one of said shafts being located immediately above said delivery aperture and the remaining two shafts being spaced apart on a horizontal plane above that of said first mentioned shaft, three flexible, elongated pusher blades mounted on each said drive shaft, said pusher blades being constituted of a flexible elastomeric material, the drive shafts and the pusher blades being spaced relative to one another such that the clearance between the respective pusher blades is sufficient to provide normal uniform compressive feeding of the low bulk density materials through the hopper and, upon overloading of the delivery device, the flexibility of said pusher blades permitting deflection thereof out of feeding engagement with the low bulk density materials whereby over-compacting of said materials is minimized.

3. A fluff feed hopper for feeding low bulk density plastic waste to an extruder, said fluff feed hopper comprising a gravity feeding frustoconically shaped feed hopper having an opening at the bottom thereof, a plurality of horizontally disposed drive shafts mounted for rotation in said hopper, one of said shafts being located immediately above said opening and at least two additional shafts being spaced apart on a horizontal plane above that of said first mentioned shaft, a plurality of flexible pusher blades mounted on each said drive shaft, said pusher blades being constituted of elastomeric material, the drive shafts and the pusher blades being spaced relative to one another such that the clearance between the respective pusher blades is sufficient to provide normal compressive feeding of the low bulk density waste through the hopper and, upon overloading of the extruder, the flexibility of said pusher blades permitting deflection thereof out of feeding engagement with the plastic wastes whereby over-compacting of such low density material is minimized.

References Cited in the file of this patent

UNITED STATES PATENTS

| | | |
|---|---|---|
| 1,668,324 | Kreisinger | May 1, 1928 |
| 1,745,938 | Lawder | Feb. 4, 1930 |
| 1,920,905 | Harper | Aug. 1, 1933 |
| 2,218,433 | Mullner | Oct. 15, 1940 |
| 2,338,034 | Gemberling et al. | Dec. 28, 1943 |
| 2,593,516 | Alley et al. | Apr. 22, 1952 |